Patented Nov. 26, 1946

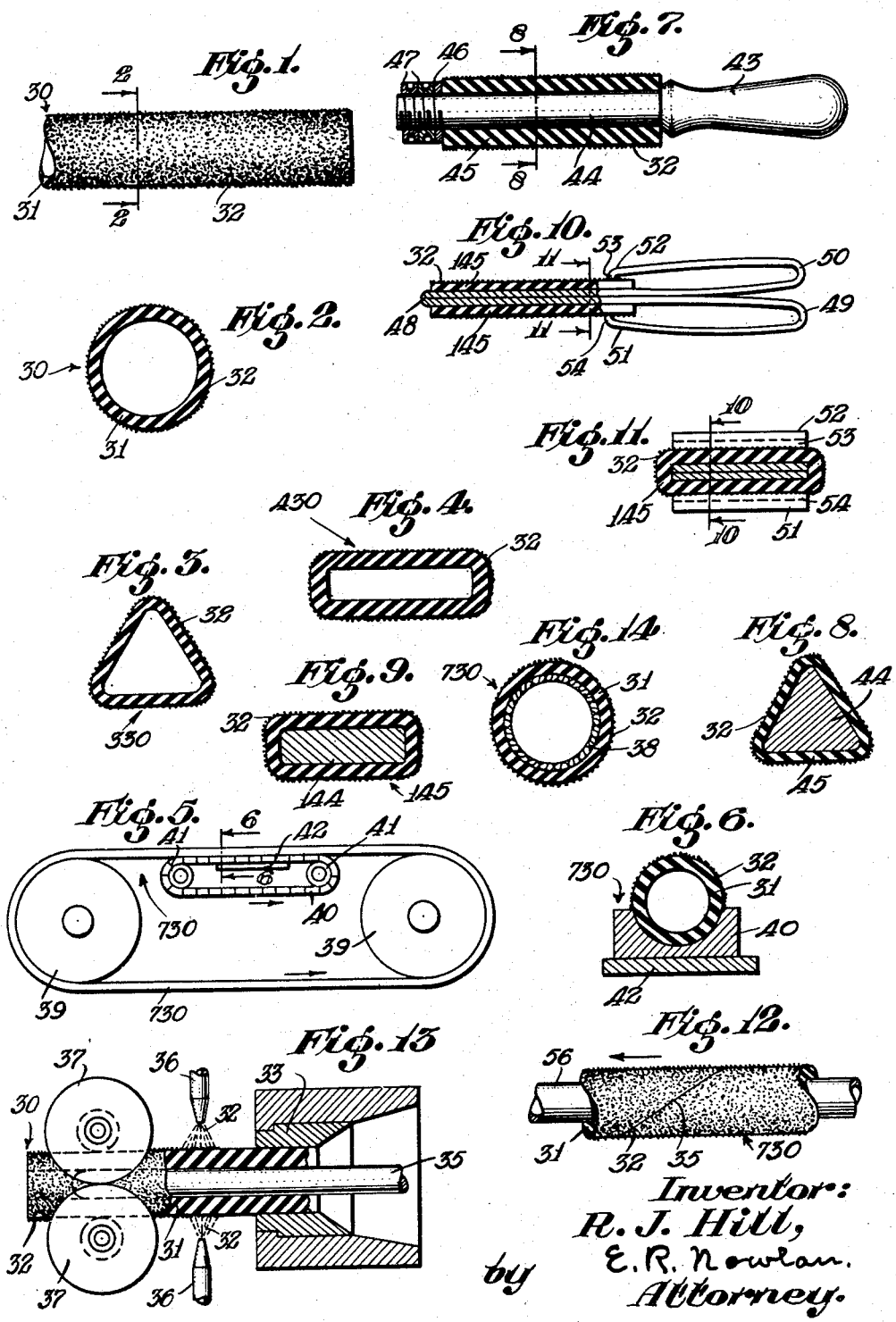

2,411,724

UNITED STATES PATENT OFFICE 2,411,724

METHOD OF MAKING TUBULAR ABRASIVE BODIES

Russell J. Hill, Cranford, N. J., assignor to Western Electric Company, Incorporated, New York, N. Y., a corporation of New York Application November 12, 1943, Serial No. 509,991

4 Claims. (Cl. 51—293)

This invention relates to a method of making a tool and more particularly to a method of making an interchangeable abrasive element for a tool.

There is a considerable variety of tools whose usefulness depends upon their abrasive action, such as rasps, files, hones, rifles, and the like, which are employed in a great variety of arts and upon almost every kind of solid material. Customarily one class of such tools consists of a handle or tang with an integral operative portion and constructed of suitable metal, the operative portion being provided over a suitable area with integral cutting or scraping teeth. In another large class of such tools, a belt or wheel driven by power may be used, to which an abrasive powder is fed, with or without a liquid vehicle to carry the powder. Again, such a belt or wheel may have a powdered abrasive incorporated into the substance of its surface.

An object of the present invention is to provide a simple, rapid and reliable method of making interchangeable abrasive elements for rasps, hones, sanders, files, and the like.

With the above and other objects in view, the invention may be illustratively embodied in the method of making an abrasive element which comprises steps of extruding a tube of hardenable soft material selected from the class consisting of thermosetting synthetic resins and polymeric thermoplastic synthetic resins and vulcanizable soft rubber compounds, applying abrasive powder to the outer surface only of the tube while still plastic, positively pressing the grains of the powder partially into the surface of the tube by rolling while still plastic, and hardening the substance of the tube to lock the grains therein.

Other objects and features of the invention will appear from the following detailed description of embodiments thereof taken in connection with the accompanying drawing in which the same reference numerals are applied to identical parts in the several figures and in which Fig. 1 is a side elevation of a portion of an abrasive element;

Fig. 2 is a section on the line 2—2 of Fig. 1;

Fig. 3 is a view similar to Fig. 2 of a modification;

Fig. 4 is a view similar to Fig. 2 of a second modification;

Fig. 5 is a diagrammatic view of an apparatus employing the element of Fig. 1;

Fig. 6 is a section on the line 6—6 of Fig. 5;

Fig. 7 is a side elevation partly in central vertical section of a tool employing the element of Fig. 3;

Fig. 8 is a section on the line 8—8 of Fig. 7;

Fig. 9 is a view similar to Fig. 8 of a modified tool;

Fig. 10 is a view in central longitudinal section of another tool;

Fig. 11 is a section on the line 11—11 of Fig. 10;

Fig. 12 is a view in side elevation of a joint in the element of Fig. 1;

Fig. 13 is a diagrammatic view of an apparatus for making the element of Fig. 1; and Fig. 14 is a view similar to Fig. 2 of another modification thereof.

A principal element of a preferred form of the invention is disclosed particularly in Figs. 1 and 2 as a tube generally indicated at 30 whose body 31 is composed of a suitable thermosetting or thermoplastic material with grains of a suitable powdered abrasive 32 embedded in the exterior surface of the tube. Such an abrasive bearing tube may be made, as digrammatically indicated in Fig. 13, by extruding the body material in a suitably soft state through a die 33 held in the die block 34 and over a mandrel 35 extending some distance out from the exit of the die. Abrasive powder 32 may be blown against the still soft surface of the tube as it leaves the die from nozzles 36, 36; and the adherent abrasive may then be embedded in the surface by suitably grooved rollers 37, 37. The material is then finally solidified.

The cross-section of the tube 30 shown in Fig. 2 is circular. For particular applications it may be preferred to give the tube or rod some other sectional form as shown, for example, at 330 in Fig. 3, or at 430 in Fig. 4.

The material of the body in each instance will be selected to meet the needs of the particular purpose in hand. In general, the body material will be one or other of the thermosetting artificial resins derived by condensation of phenol type compounds with aldehyde type compounds, material of which the familiar phenolformaldehyde condensation product bakelite is an example, or the body material will be one of the thermoplastic artificial resins such as the superpolymerized polymers or copolymers of ethylene, butadiene, styrene, vinylidene, and the like and of their halogen and other substitution products; or the body material may be a vulcanizable compound whose characteristic ingredient is natural rubber, Buna rubber, neoprene or another of the vulcanizable synthetic rubber substances. The abrasive 32 may be any suitably hard substance, powdered for the present use, e. g., alumina, silicon carbide, emery, garnet, or other grit, or rouge or the like for polishing.

Thus, for example, if a suitable flexible and tough member of the thermoplastic resins be selected, a liner 38 of suitably tough strands, textile thread or cord, or wire, may be fed over the mandrel 35 in Fig. 13, to produce the tube 730 of Fig. 14, in which the liner 38 is embedded in the inner surface of the tube to give tensile strength to the tube without material reduction of flexibility. A suitable length of this tube may then have its ends joined to form an endless belt, as indicated in Fig. 5, passing over and driven by two sheaves 39, 39. A secondary belt 40 driven by sheaves 41, 41 runs against the under side of the upper part of the belt 730 (Fig. 6). The upper side of the running portion of the belt 730 over the support 42 may then be used in familiar fashion to polish or abrade articles held down on it. In such a case the body of the tube 730 may well be one of the tensilely tough polystyrene polymers and the abrasive may be, for example, rouge for polishing or silicon carbide for abrading. Polystyrenes suitable for such purposes have already appeared commercially on the market as garment belts and suspenders and have sufficient tensile strengths to be used in such an apparatus as indicated in Fig. 5 even without the liner 42, i. e., in the form shown in Fig. 1.

Figs. 7 and 8 show the invention embodied in a tool similar to a three cornered file. A handle 43 has a tang 44 of triangular cross-section secured therein. Over this is removably fitted a tight sleeve 45 cut to appropriate length from the tube 330 shown in Fig. 3, and held in place on the tang 44 by a washer 46 and lock nuts 47, 47. The tang need not necessarily be triangular. Fig. 9 shows a section analogous to that shown in Fig. 8, in which the tang 144 is rectangular and the abrasive sleeve 145 held in place on it is cut from the tube 430 of Fig. 4.

Figs. 10 and 11 show another manner of interchangeably supporting a sleeve 145. For this a flat ribbon of spring metal is bent double at 48, bent back again double outwardly at 49 and 50, and bent inwardly at right angles at 51 and 52 to form gripping jaws 53 and 54 spring pressed against the long main sections between 48 at the left and 49 and 50 at the right. The left half of the main section then forms a tang over which a sleeve 145 may be slipped to be gripped by the jaws 53 and 54 as shown, while the right half of the article thus assembled is a handle for manipulation of the tool.

In the case disclosed in Figs. 5 and 6, the substance of the body carrying the abrasive will evidently need to be flexible and tough. In the arrangements shown in Figs. 7, 8, 9, 10 and 11, this substance will be selected with an eye to the work to be done; and a single tool may be provided with a plurality of interchangeable abrasive sleeves with the body material varying from relatively soft and elastic, e. g., a soft vulcanized rubber compound, to definitely hard, rigid and infusible, e. g., Bakelite.

Fig. 12 shows a suitable method of securing together the ends of such a piece of tubing. The ends are scarfed to match along a diagonally transverse plane 55, are slipped over an elongated plug 56, preferably a thin walled tube of the same substance as the material of the tube body; and the tube ends are cemented to each other along the scarf plane 55 and also over the plug 56.

What is claimed is:

1. The method of making an abrasive element which comprises steps of extruding a tube of hardenable soft material selected from the class consisting of thermosetting synthetic resins and polymeric thermoplastic synthetic resins and vulcanizable soft rubber compounds, applying abrasive powder to the outer surface only of the tube while still plastic, positively pressing the grains of the powder partially into the surface of the tube by rolling while still plastic, and hardening the substance of the tube to lock the grains therein.

2. The method of making an abrasive element which comprises steps of extruding a tube of hardenable soft thermosetting synthetic resin, applying abrasive powder to the outer surface only of the tube while still plastic, positively pressing the grains of the powder partially into the surface of the tube by rolling while still plastic, and hardening the substance of the tube to lock the grains therein.

3. The method of making an abrasive element which comprises steps of extruding a tube of hardenable soft thermoplastic synthetic resin, applying abrasive powder to the outer surface only of the tube while still plastic, positively pressing the grains of the powder partially into the surface of the tube by rolling while still plastic, and hardening the substance of the tube to lock the grains therein.

4. The method of making an abrasive element which comprises steps of extruding a tube of vulcanizable soft rubber compound, applying abrasive powder to the outer surface only of the tube while still plastic, positively pressing the grains of the powder partially into the surface of the tube by rolling while still plastic, and vulcanizing the substance of the tube to lock the grains therein.

RUSSELL J. HILL.